United States Patent
Elshafie et al.

(10) Patent No.: US 12,309,698 B2
(45) Date of Patent: May 20, 2025

(54) WAKEUP SIGNAL DETECTION FEEDBACK

(71) Applicant: QUALCOMM Incorporated, San Diego, CA (US)

(72) Inventors: Ahmed Elshafie, San Diego, CA (US); Hung Dinh Ly, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 17/805,306

(22) Filed: Jun. 3, 2022

(65) Prior Publication Data

US 2023/0397107 A1 Dec. 7, 2023

(51) Int. Cl.
*H04W 52/02* (2009.01)
*H04L 1/1607* (2023.01)

(52) U.S. Cl.
CPC ....... *H04W 52/0229* (2013.01); *H04L 1/1664* (2013.01)

(58) Field of Classification Search
None
See application file for complete search history.

(56) References Cited

U.S. PATENT DOCUMENTS

| | | | | |
|---|---|---|---|---|
| 12,069,764 | B2* | 8/2024 | Nimbalker | ........ H04W 52/0229 |
| 2019/0075519 | A1 | 3/2019 | Li et al. | |
| 2019/0075520 | A1 | 3/2019 | Li et al. | |
| 2020/0045635 | A1* | 2/2020 | Lin | ................... H04W 52/0248 |
| 2020/0059951 | A1* | 2/2020 | Frenne | .............. H04W 72/1268 |
| 2020/0145921 | A1 | 5/2020 | Zhang et al. | |
| 2020/0229098 | A1* | 7/2020 | Cheng | ............... H04W 52/0248 |
| 2021/0243763 | A1* | 8/2021 | Zhou | ..................... H04L 1/1671 |
| 2022/0007443 | A1* | 1/2022 | Xu | ........................ H04W 24/10 |
| 2022/0116875 | A1* | 4/2022 | Nimbalker | ........ H04W 52/0216 |
| 2022/0141770 | A1* | 5/2022 | Ahn | .................. H04W 52/0222 370/318 |
| 2022/0182942 | A1* | 6/2022 | Guo | ................... H04W 52/0235 |
| 2022/0322234 | A1* | 10/2022 | Niu | .................... H04W 52/0274 |
| 2023/0300750 | A1* | 9/2023 | Wu | .................... H04W 52/0232 |
| 2023/0388077 | A1* | 11/2023 | Maleki | .................. H04W 76/27 |
| 2024/0155490 | A1* | 5/2024 | Khlass | .................. H04L 5/0051 |
| 2024/0196469 | A1* | 6/2024 | Oteri | ..................... H04W 76/27 |

FOREIGN PATENT DOCUMENTS

WO 2019051953 A1 3/2019

OTHER PUBLICATIONS

International Search Report and Written Opinion—PCT/US2023/023978—ISA/EPO—Nov. 27, 2023.
Partial International Search Report—PCT/US2023/023978—ISA/EPO—Oct. 4, 2023.

* cited by examiner

*Primary Examiner* — German Viana Di Prisco
(74) *Attorney, Agent, or Firm* — Patterson & Sheridan LLP

(57) ABSTRACT

Certain aspects of the present disclosure provide techniques for wireless communications by a user equipment (UE). A technique includes receiving an indication of one of a first radio or a second radio; receiving, using the first radio, a wakeup signal; and transmitting, using the indicated one of the first radio or the second radio, feedback indicating reception of the wakeup signal.

28 Claims, 13 Drawing Sheets

WAKEUP SIGNAL DETECTION FEEDBACK

BACKGROUND

Field of the Disclosure

Aspects of the present disclosure relate to wireless communications, and more particularly, to techniques for wakeup signal detection feedback.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

In certain aspects, to reduce power at a user equipment (UE) for monitoring for a wakeup signal (WUS), a UE may include a wakeup radio (WUR) configured for monitoring a WUS. The UE may use the WUR for monitoring for/receiving a WUS, and may use a main radio (MR) for monitoring for/receiving other types of signals, such as downlink data signals.

In certain aspects, the WUR has less complexity or fewer components (e.g., no automatic gain control (AGC), no low noise amplifier (LNA), etc.) than the MR, and therefore uses less energy to monitor for a WUS than the MR.

In certain aspects, the UE is configured to send feedback to a network entity indicating that the UE has successfully received and decoded a WUS. In certain aspects, the network entity may determine whether the UE receives and decodes a WUS successfully through a random access channel (RACH) procedure or a scheduling request (SR) procedure.

Certain aspects herein relate to whether the UE uses the WUR or the MR to transmit the feedback regarding reception and decoding of the WUS to the network entity. For example, in certain aspects, the UE includes a WUR that is further capable of transmitting signals, such as feedback for the WUS. In certain aspects, the techniques herein may allow for selection between whether the UE uses the WUR or the MR to transmit the feedback based on one or more conditions. The use of the WUR or MR for transmitting the feedback in different circumstances may provide power savings in the particular circumstances.

One aspect provides a method of wireless communications by a user equipment (UE). The method includes receiving an indication of one of a first radio or a second radio; receiving, using the first radio, a wakeup signal; and transmitting, using the indicated one of the first radio or the second radio, feedback indicating reception of the wakeup signal.

Another aspect provides a method of wireless communications by a network entity. The method includes sending an indication of one of a first radio or a second radio of a UE; sending a wakeup signal to the UE; and obtaining, from the UE, feedback indicating reception of the wakeup signal.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
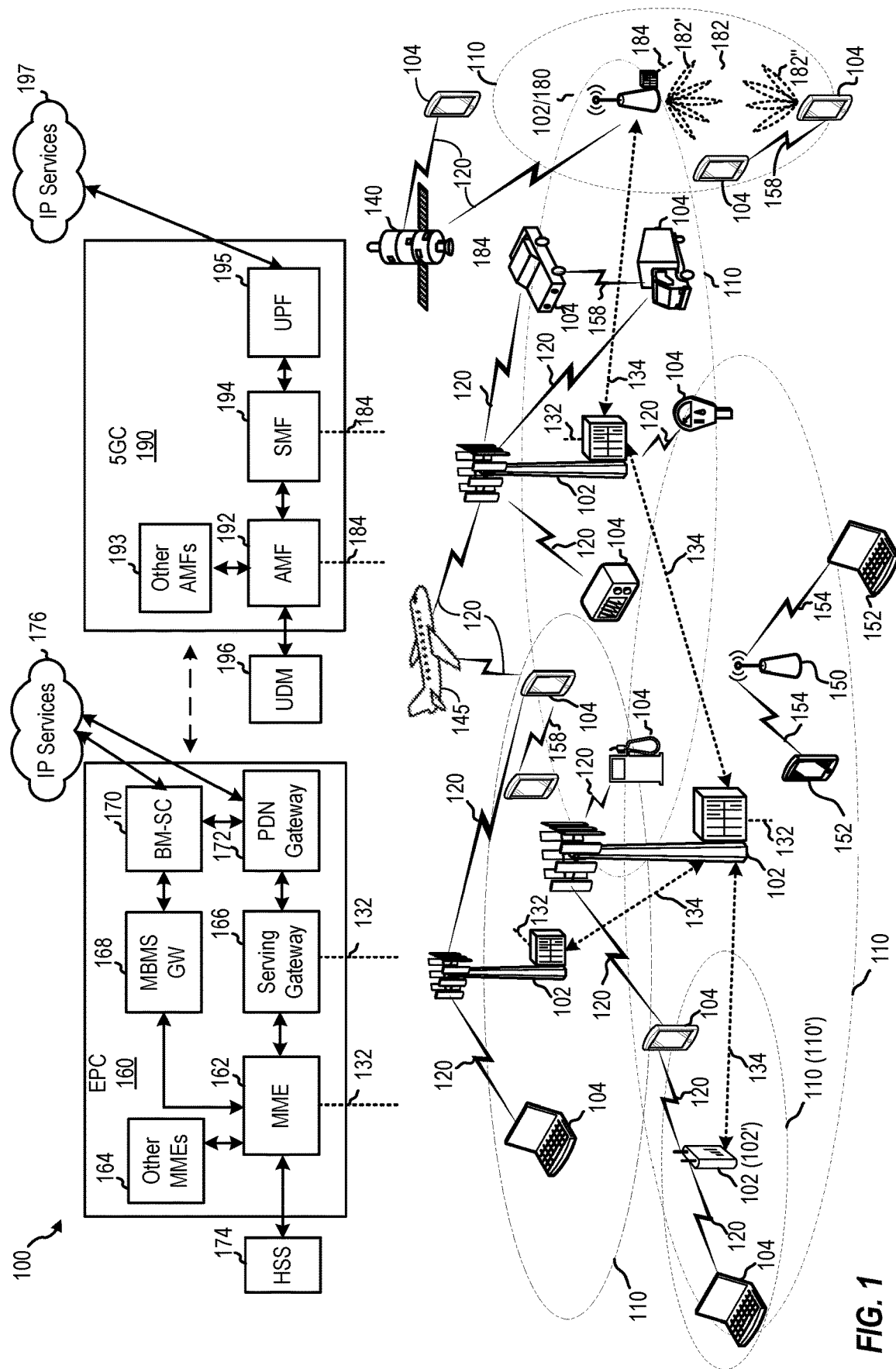
FIG. 1 depicts an example wireless communications network.

Aspects of the present disclosure provide apparatuses, methods, processing systems, and computer-readable mediums for wakeup signal (WUS) detection feedback. In particular, certain aspects provide techniques for selecting between a first radio (e.g., a wakeup radio (WUR)) of a user equipment (UE) and a second radio (e.g., a main radio (MR)) of the UE for transmission of feedback regarding detection of the WUS by the UE. Though certain aspects herein are described with respect to a WUR and a MR, the techniques herein may be applicable to other types of radios.

In certain aspects, a UE is configured to periodically enter a low power mode (e.g., a sleep mode). For example, a UE may be configured with a discontinuous reception (DRX) cycle. DRX configures short and long DRX configurations that provide ON durations and OFF durations, where the UE monitors for transmissions during the ON durations (e.g., in an active mode) and enters a low power mode during the OFF durations. Though certain aspects are described herein with respect to DRX cycles, the techniques herein may be applicable to other types of ON/OFF cycles.

In some cases, a UE may not have any data for communication during a particular ON duration. For example, the network entity may not have data to transmit to the UE during the ON duration. Accordingly, to avoid the UE having to "wakeup" from the low power mode and monitor for transmissions during such an ON duration, a network entity, such as a base station (BS) in communication with the UE or another UE in sidelink communication with the UE, may transmit a WUS to the UE. The UE may only monitor for transmissions during an ON duration for which it receives a WUS from the network entity, and remain in a low power mode for any ON duration for which it does not receive a WUS. Accordingly, the UE may not wakeup for an entire ON duration, which may save power at the UE. The UE may be configured to monitor for a WUS, such as at specific time periods (e.g., periodically). Monitoring for a WUS may require less power at the UE than monitoring for transmissions during an ON duration.

In certain aspects, to further reduce power at the UE for monitoring for a WUS, a UE may include a WUR configured for monitoring a WUS. The UE may use the WUR for monitoring for/receiving a WUS, and may use a MR for monitoring for/receiving other types of signals, such as downlink data signals.

In certain aspects, the WUR has less complexity or fewer components (e.g., no automatic gain control (AGC), no low noise amplifier (LNA), etc.) than the MR, and therefore uses less energy to monitor for a WUS than the MR. In certain aspects, the WUR only needs an envelope detector (e.g., including a selector to downconvert the signal to the baseband and a mixer) to detect a WUS. The MR may be the modem of the UE. Accordingly, the WUR can operate with lower power than the MR.

In certain aspects, the UE is configured to send feedback to the network entity indicating that the UE has successfully received and decoded a WUS. In certain aspects, the network entity may determine whether the UE receives and decodes a WUS successfully through a random access channel (RACH) procedure or a scheduling request (SR) procedure.

In certain aspects, the network entity may be configured to refrain from assigning resources (e.g., uplink, downlink, or sidelink resources, such as time, frequency resources, and/or spatial resources) to the UE during an ON duration for which the network entity has sent a WUS, but the network entity does not receive feedback that the UE successfully received and decoded the WUS. Such resources could be assigned for other UEs, to increase use of the available resources. In particular, as the UE does not indicate it received and decoded the WUS, the UE will remain in a low power mode and would not communicate during the ON duration anyway.

Certain aspects herein relate to whether the UE uses the WUR or the MR to transmit the feedback regarding reception and decoding of the WUS to the network entity. For example, in certain aspects, the UE includes a WUR that is further capable of transmitting signals, such as feedback for the WUS. In certain aspects, the techniques herein may allow for selection between whether the UE uses the WUR or the MR to transmit the feedback based on one or more conditions. The use of the WUR or MR for transmitting the feedback in different circumstances may provide power savings in the particular circumstances.

Certain aspects herein relate to which resources (e.g., what physical channel) the UE uses to transmit the feedback regarding reception and decoding of the WUS to the network entity. In certain aspects, the UE transmits the feedback as part of an uplink mobility signal (e.g., a RACH message, a sounding reference signal (SRS), another signal used for uplink radio resource management (RRM) measurement or radio link monitoring (RLM) measurement, etc.) when one or more conditions are met. For example, transmitting the feedback multiplexed with an uplink mobility signal may mean the UE uses less power for transmitting the feedback, as it does not need to separately transmit in another resource, and my further free other resources for other uses.

In certain aspects, occasions (e.g., configured resources) for transmitting an uplink mobility signal may occur periodically. In certain aspects, the periodicity may be large, meaning there may be latency between when a UE receives a WUS and when a next occasion for uplink mobility signal transmission may occur. Accordingly, in certain aspects, the one or more conditions for whether the UE transmits the feedback as part of an uplink mobility signal includes a gap size between a start of an uplink mobility signal transmission occasion and an ON duration. If the gap size is larger than a threshold, the feedback may be transmitted in an ON duration prior to the uplink mobility signal transmission occasion, thereby reducing feedback latency.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
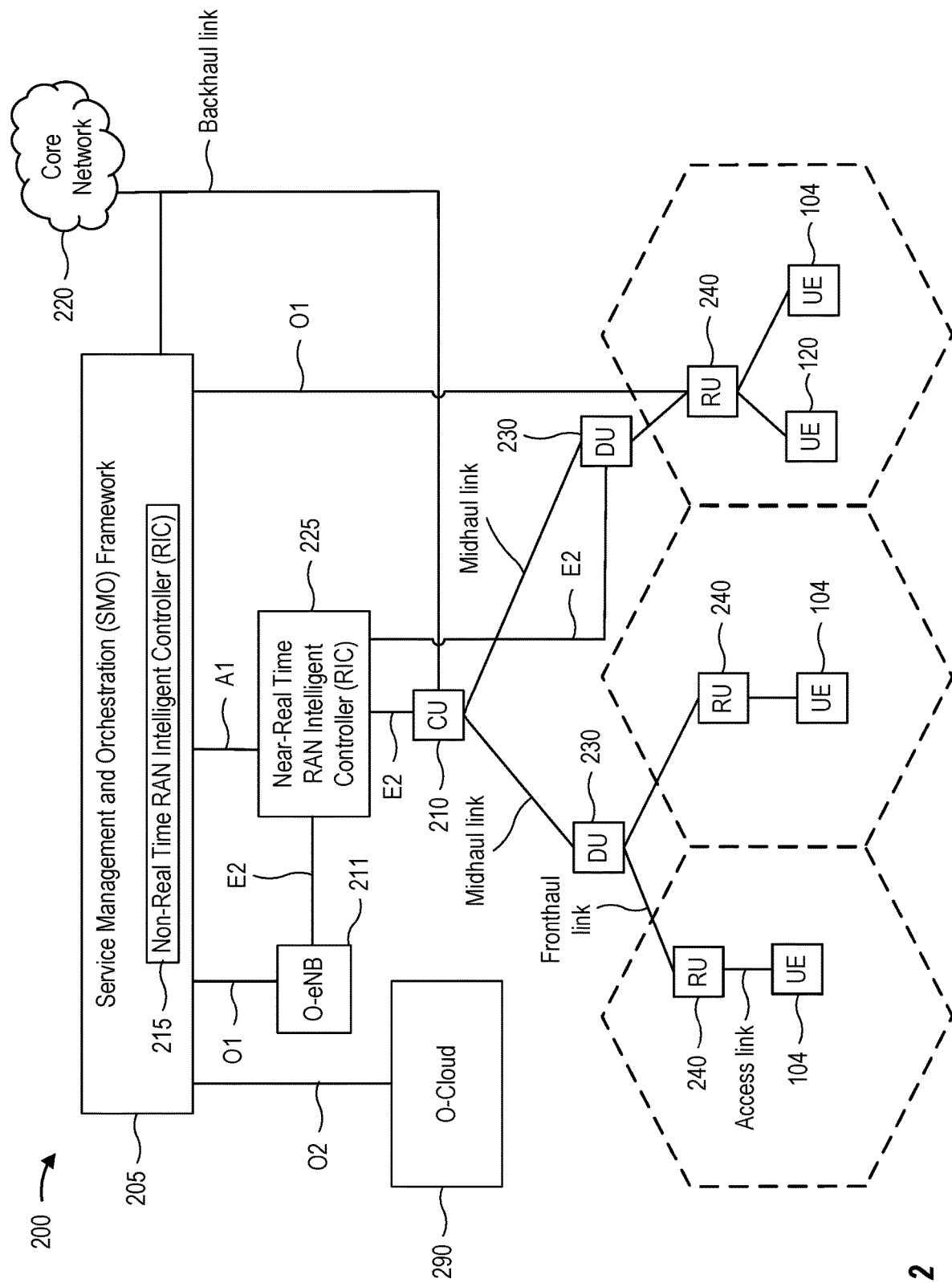
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
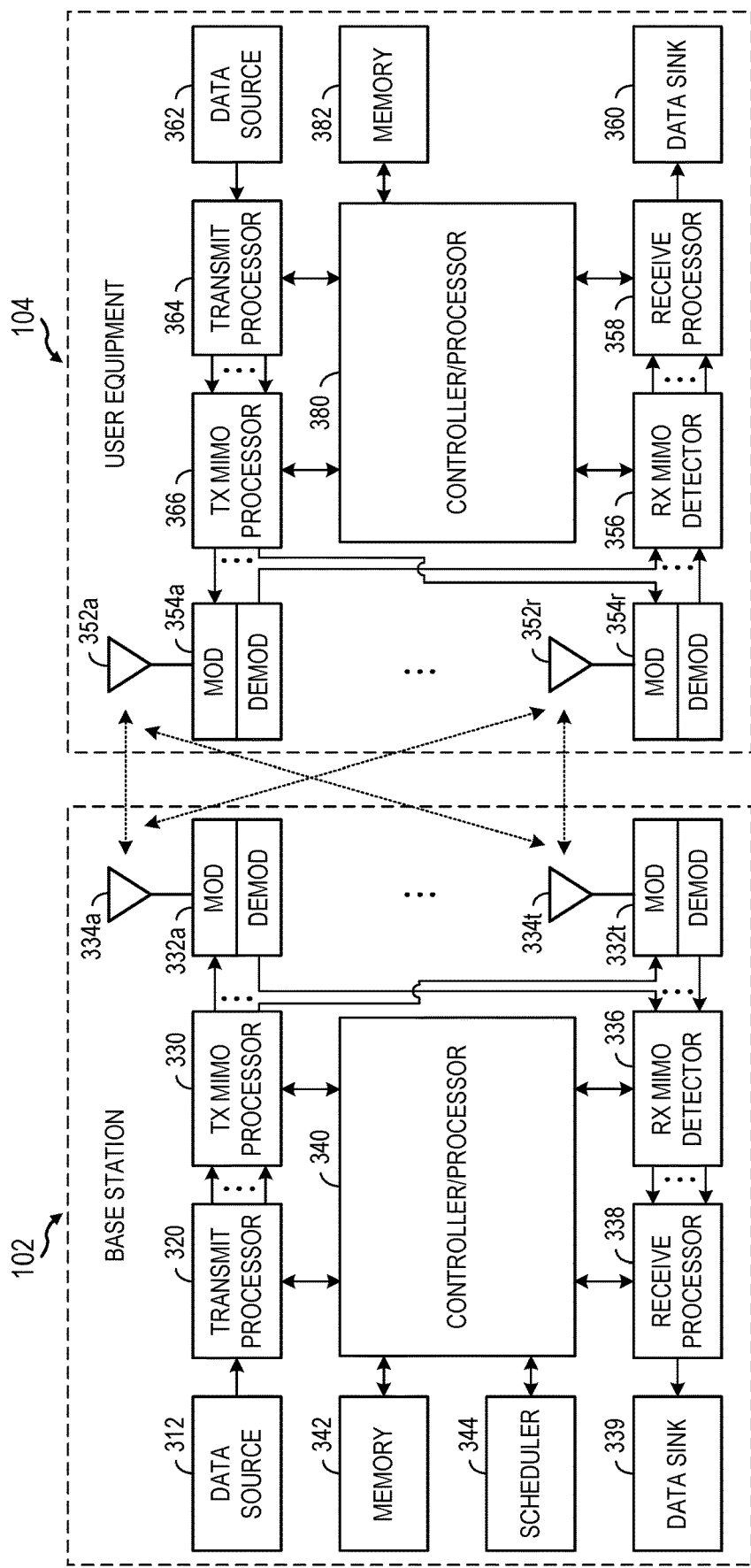
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
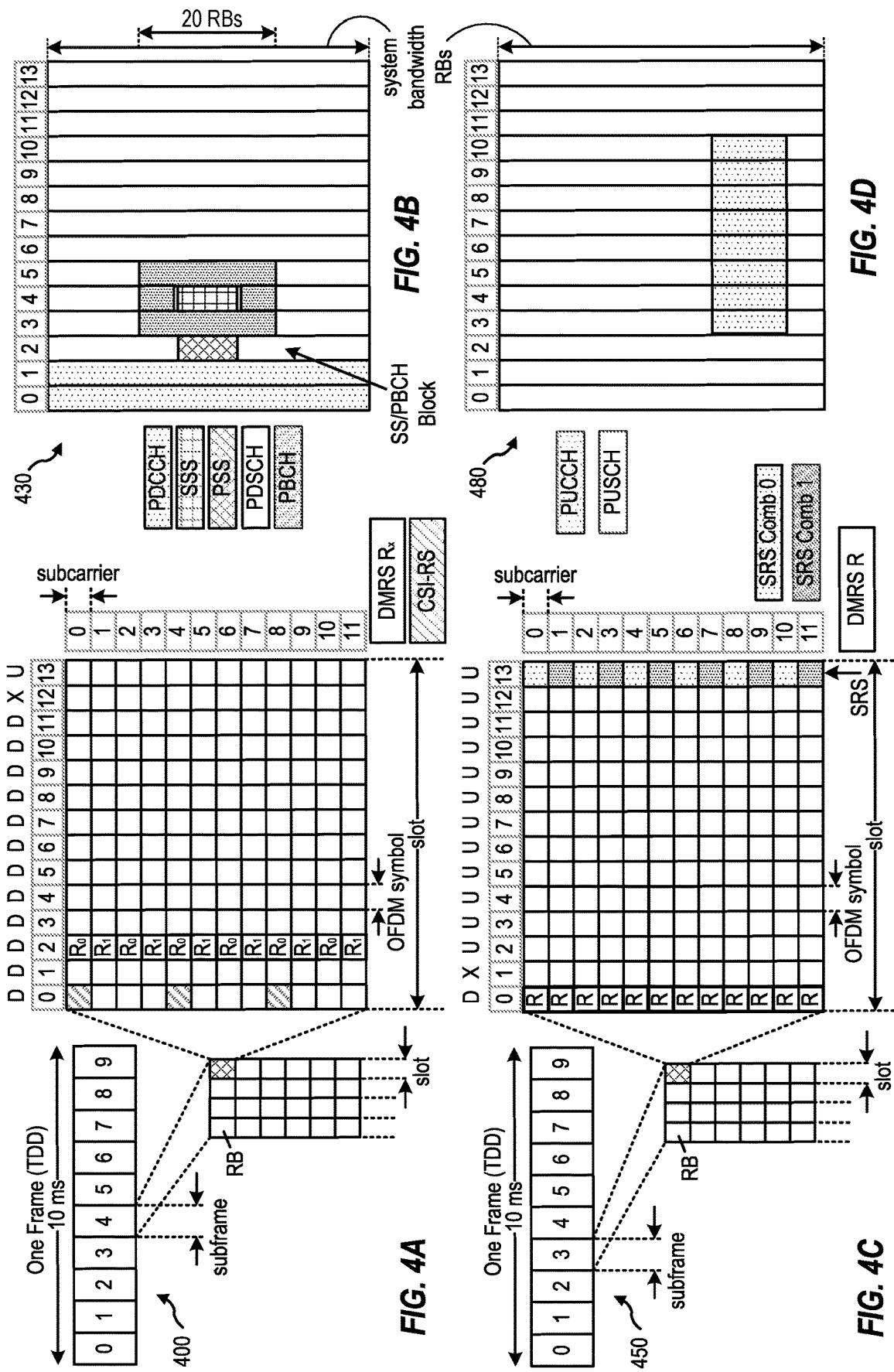
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to WUS Detection Feedback

Figure 5:
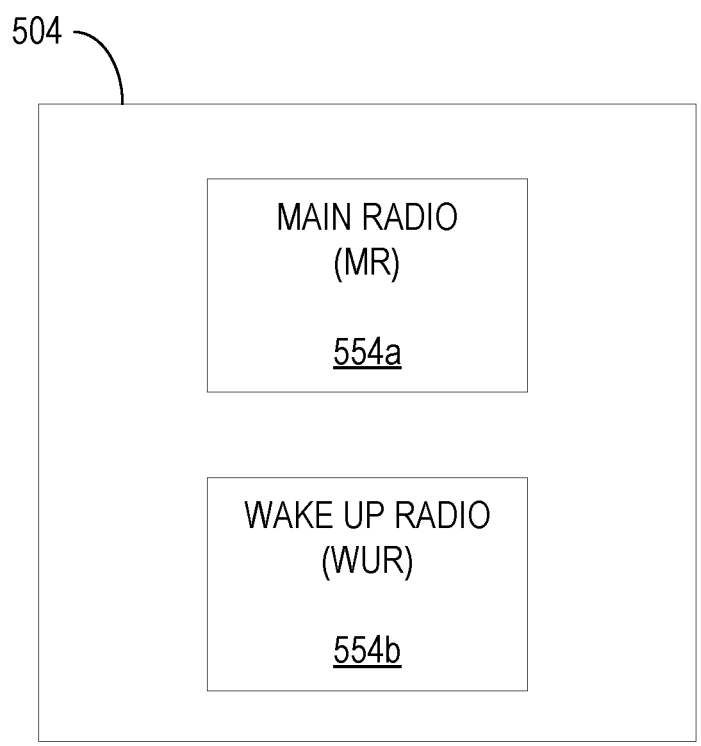
FIG. 5 illustrates an example of a user equipment (UE) including a main radio (MR) and a wakeup radio (WUR).

As discussed, certain aspects herein relate to whether a UE uses a WUR or an MR to transmit the feedback regarding reception and decoding of a WUS to a network entity. FIG. 5 illustrates an example of a UE 504 including an MR 554a and a WUR 554b. The UE 504 may be an example of a UE 104 depicted and described with respect to FIGS. 1 and 3. For example, the UE 504 may include other components (not shown) described with respect to UE 104. In certain aspects, the MR 554a corresponds to transceiver 354a depicted and described with respect to FIG. 3. In certain aspects, the WUR 554b corresponds to transceiver 354b depicted and described with respect to FIG. 3.

In certain aspects, the WUR 554b has less complexity or fewer components (e.g., no automatic gain control (AGC), no low noise amplifier (LNA), etc.) than the MR 554a, and therefore uses less energy to monitor for a WUS than the MR 554a. In certain aspects, the WUR 554b only includes an envelope detector (e.g., including a selector to downconvert the signal to the baseband and a mixer) to detect a WUS. The MR 554a may be the modem of the UE 504. Accordingly, in certain aspects, the WUR 554b can operate with lower power than the MR 554a.

Figure 6:
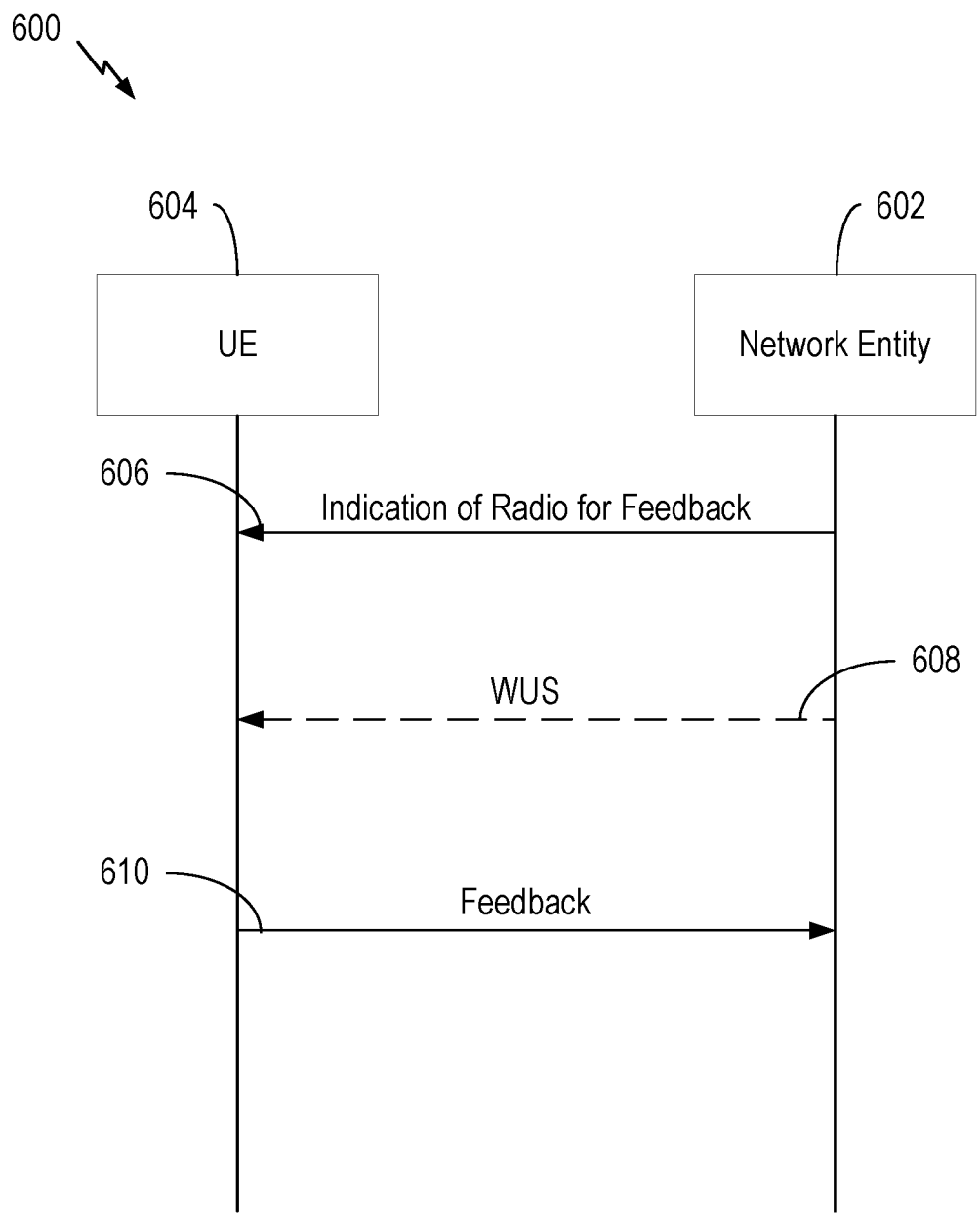
FIG. 6 depicts a process flow for communications in a network between a network entity and a user equipment (UE).

FIG. 6 depicts a process flow 600 for communications in a network between a network entity 602 and a user equipment (UE) 604. In some aspects, the network entity 602 may be an example of the BS 102 depicted and described with respect to FIGS. 1 and 3 or a disaggregated base station depicted and described with respect to FIG. 2. In some aspects, the network entity 602 may be another UE. Similarly, the UE 604 may be an example of UE 104 depicted and described with respect to FIGS. 1 and 3, such as UE 504 depicted and described with respect to FIG. 5. However, in other aspects, UE 604 may be another type of wireless communications device and network entity 602 may be another type of network entity or network node, such as those described herein.

Process flow 600 is an example of a process flow for communicating WUS detection feedback. At 606, network entity 602 sends an indication to UE 604, the indication indicating one of a first radio or a second radio of the UE 604 that UE 604 should use for communicating WUS detection feedback to the network entity 602. For example, the first radio may be a WUR, such as WUR 554b depicted and described with respect to FIG. 5 and the second radio may be an MR, such as MR 554a depicted and described with respect to FIG. 5.

At 608, UE 604 monitors for a WUS from network entity 602. For example, the UE 604 may be configured to monitor for WUS using the WUR 554b on each of one or more time-frequency resources. In certain aspects, UE 604 monitors for the WUS using WUR 554b, as the WUR 554b is a WUR configured for monitoring for WUS.

In certain aspects, network entity 602, prior to 608, may transmit signaling (e.g., L1, L2, and/or L3 signaling) indicating one or more time-frequency resources (also referred to as WUS monitoring occasions) available for communicating WUS. In some aspects, the signaling indicates 1) an offset (e.g., in slots, symbols, etc.) with respect to a starting time-frequency resource (e.g., a frame, subframe, etc.); and 2) a periodicity at which the time-frequency resources occur. The network entity 602 may be configured to transmit WUS in a given time-frequency resource of the one or more time-frequency resources when there is a communication to occur between the UE 604 and the network entity 602 (e.g., the network entity 602 has data to transmit to the UE 604), such as in an ON duration occurring in time after occurrence of the time-frequency resource. The network entity 602 may be configured to not transmit WUS in a given time-frequency resource of the one or more time-frequency resources when there is no communication to occur between the UE 604 and the network entity 602, such as in an ON duration occurring in time after occurrence of the time-frequency resource.

In certain aspects, the WUS is transmitted specifically to UE 604. In certain aspects, the WUS is broadcast or multicast to multiple UEs. In certain aspects, the UE 604 is operating in a low power mode when monitoring for the WUS. For example, a WUS monitoring occasion may occur during an OFF duration of an ON/OFF cycle. The UE 604 may use the WUR 554*b* to monitor for (and when transmitted by the network entity 602, receive) the WUS.

Continuing, at 610, UE 604 transmits feedback (also referred to as WUS detection feedback) regarding whether a WUS was detected at 608 to network entity 602 using the one of the first radio or the second radio indicated at 606. For example, when the network entity 602 transmits a WUS at 608, and the UE 604 successfully receives and decodes the WUS, the UE 604 may send feedback to the network entity 602 indicating it received the WUS. In another example, when the network entity 602 transmits a WUS at 608, and the UE 604 does not successfully receive and decode the WUS, the UE 604 may send feedback to the network entity 602 indicating it did not receive the WUS. In yet another example, when the network entity 602 does not transmit a WUS at 608, the UE 604 may send feedback to the network entity 602 indicating it did not receive a WUS.

In certain aspects, the UE 604 may be configured to send feedback only when UE 604 successfully receives and decodes a WUS (e.g., similar to an acknowledgement (ACK)) and does not send feedback when UE 604 does not successfully receive and decode a WUS. Accordingly, network entity 602 may determine that when no feedback is received from UE 604, UE 604 did not successfully receive and decode a WUS.

In certain aspects, the UE 604 may be configured to send feedback only when UE 604 does not successfully receive and decode a WUS (e.g., similar to a negative acknowledgement (NACK)) and does not send feedback when UE 604 does successfully receive and decode a WUS. Accordingly, network entity 602 may determine that when no feedback is received from UE 604, UE 604 did successfully receive and decode a WUS.

In certain aspects, UE 604 performs pathloss measurement based on a received WUS at 608, and uses the pathloss measurement to perform uplink power control for transmitting the feedback at 610. In certain aspects, such as where the UE 604 is capable of beamforming, the UE 604 transmits the feedback at 610 using a same or similar transmit (Tx) beam or a quasi-co-located Tx beam as the receive (Rx) beam used by UE 604 to receive the WUS at 608.

Aspects Related to Radio Selection for WUS Detection Feedback

In certain aspects, the indication at 606 indicates to the UE 604 to use the WUR 554*b* for communicating WUS detection feedback to the network entity 602. In certain aspects, using the WUR 554*b* as compared to using the MR 554*a* allows UE 604 to postpone waking up (e.g., powering up) MR 554*a*, which may consume more power than powering up WUR 554*b*. For example, if no WUS is detected at 608, then UE 604, and accordingly MR 554*a*, does not need to exit the low energy state during the next ON duration, thereby saving energy.

In certain aspects, the indication at 606 indicates to the UE 604 to use the MR 554*a* for communicating WUS detection feedback to the network entity 602. In certain aspects, using the MR 554*a*, the MR 554*a* can power up to decode paging, such as the WUS, and then transmit feedback. In certain aspects, using the MR 554*a*, the UE 604 can transmit the feedback through a random access channel (RACH), such as multiplexed with other information, when the UE 604 transitions from an idle or inactive state (e.g., idle or inactive radio resource control (RRC) state) to a connected state (e.g., RRC connected state). In certain aspects, using the MR 554*a*, the UE 604 can transmit the feedback as part of a schedule request procedure, such as multiplexed with other information, when the UE is in a connected state. In certain aspects, using the MR 554*a*, the UE 604 can transmit the feedback in an uplink specific reference signal (RS) such as a sounding reference signal (SRS), when the UE is in a connected state.

In certain aspects, prior to 606, UE 604 may send an indication (e.g., a report) to network entity 602 of UE 604's capability as to whether it can use the WUR 554*b* for transmission, such as to transmit feedback. In certain aspects, the report indicates what one or more types of signals the UE 604 can use to transmit feedback when using WUR 554*b*. Examples of types of signals include, uplink control information (UCI) based on a sequence (e.g., cyclic shift of a sequence), UCI based on polar encoding, UCI multiplexed with data (e.g., multiplexed with physical uplink shared channel (PUSCH), such as using a low-density parity-check (LDPC) encoder. The network entity 602 may use such reporting of the capability of UE 604 to determine what radio to indicate at 606.

In certain aspects, prior to 606, UE 604 can indicate a preference to network entity 602 as to which radio it prefers to use for transmitting the feedback, such as in L1, L2, and/or L3 signaling and/or dedicated resources for preference communication. In certain aspects, the UE 604 selects a particular radio as preferred based on the UE 604's battery or energy status, such as selecting the WUR 554*b* when the battery level is below a threshold, and selecting the MR 554*a* when the batter level is above the threshold. The network entity 602 may take such preference into account, but may not necessarily follow the UE 604's preference. In certain aspects, UE 604 can update a previous preference and indicate to network entity 602 a new preference as to which radio it prefers to use for transmitting the feedback.

Aspects Related to Communication Channel Selection for WUS Detection Feedback

In certain aspects, UE 604 is configured to select a communication channel to transmit the WUS detection feedback. In certain aspects, the selected communication channel is independent of whether UE 604 transmits the feedback using the WUR 554*b* or the MR 554*a*. In certain aspects, the UE 604 selects a communication channel based on one or more conditions. In certain aspects, the UE 604 is configured to use a particular communication channel, such as by network entity 602, to transmit the feedback.

In certain aspects, UE 604 may be configured to transmit an uplink (UL) mobility signal to network entity 602. The UL mobility signal may be a signal used by network entity 602 for performing UL radio resource management (RRM) measurements for UE 604. In certain aspects, the UL RRM measurements may be used for cell selection for a UE 604. For example, when UE 604 is in an idle or inactive mode, UE 604 is configured to send a UL mobility signal as part of a RACH process, such as message A (MsgA) in 2-step RACH. As another example, when UE 604 is in a connected mode, UE 604 is configured to send a UL mobility signal such as a sounding reference signal (SRS).

In certain aspects, UE 604 is configured to use UL mobility occasions to transmit UL mobility signals. UL mobility occasions may correspond to time-frequency resources allocated for communication of UL mobility signals. In certain aspects, the UL mobility occasions occur periodically. In certain aspects, network entity 602, may transmit signaling (e.g., L1, L2, and/or L3 signaling) indicating one or more time-frequency resources to be used as UL mobility occasions. In some aspects, the signaling indicates 1) an offset (e.g., in slots, symbols, etc.) with respect to a starting time-frequency resource (e.g., a frame, subframe, etc.); and 2) a periodicity at which the time-frequency resources occur.

In certain aspects, UE 604 is configured to transmit the WUS detection feedback as part of (e.g., multiplexed with) a UL mobility signal, such as in a UL mobility occasion. For example, UE 604 may transmit a 1-bit indication in MsgA to network entity 602 as part of a 2-step RACH to indicate whether WUS is detected or not when in an idle or inactive RRC state. As another example, UE 604 may transmit a 1-bit indication in a dedicated UL grant signal (e.g., physical uplink control channel (PUCCH) or SRS signal) to network entity 602 to indicate whether WUS is detected or not when in an RRC connected state.

In certain aspects, whether the UE 604 transmits the WUS detection feedback as part of a UL mobility signal is based on one or more conditions. For example, the periodicity of UL mobility occasions may be large, and therefore always transmitting WUS detection feedback as part of a UL mobility signal may lead to some feedback being transmitted with large latency (e.g., up to the periodicity). Therefore, in certain aspects, the one or more conditions include a gap size between a start of a UL mobility occasion and a start of an ON duration occurring after a WUS monitoring occasion.

Figure 7:
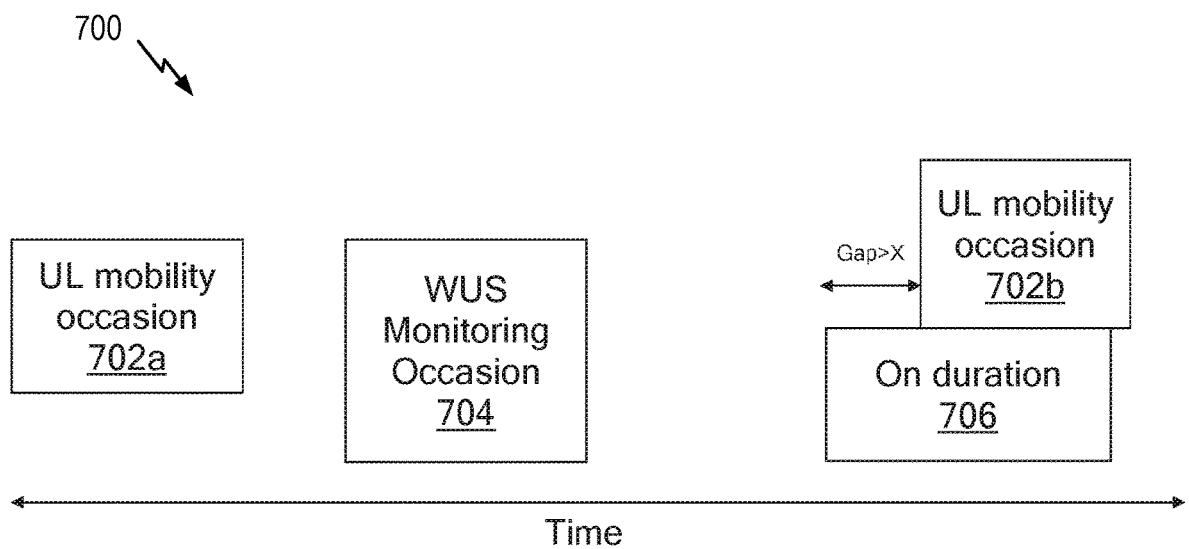
FIG. 7 illustrates an example timeline for wakeup signal (WUS) detection feedback based on a gap size between a start of an uplink (UL) mobility occasion and a start of an ON duration occurring after a WUS monitoring occasion.

FIG. 7 illustrates an example timeline 700 for WUS detection feedback based on a gap size between a start of a UL mobility occasion and a start of an ON duration occurring after a WUS monitoring occasion. As shown in timeline 700, UL mobility occasions 702 occur periodically, and are shown occurring as UL mobility occasions 702a and UL mobility occasions 702b. Though only two UL mobility occasions 702 are shown, more such UL mobility occasions 702 may occur, such as with the same periodicity.

Further, WUS monitoring occasion 704 occurs in time between UL mobility occasion 702a and UL mobility occasion 702b. Accordingly, the UL mobility occasion 702b is the first UL mobility occasion 702 in time on which UE 604 can transmit WUS detection feedback along with a UL mobility signal. In addition, an ON duration 706 occurs in time after the WUS monitoring occasion 704. The UL mobility occasion 702b and ON duration 706 are shown as overlapping in time. However, in some aspects, UL mobility occasion 702b and ON duration 706 may not overlap in time.

In certain aspects, UE 604 determines whether to transmit WUS detection feedback, for WUS monitoring occasion 704, in UL mobility occasion 702b based on whether a gap size between the start in time of the ON duration 706 and the start in time of the UL mobility occasion 702b is greater than a threshold gap size X (e.g., and where the UL mobility occasion 702b starts in time after the ON duration 706). For example, when the gap size is greater than (e.g., or equal to) the threshold, the UE 604 may transmit the WUS detection feedback in ON duration 706 prior to the start of UL mobility occasion 702b, such as to avoid excess latency in transmitting the feedback. In certain aspects, UE 604 is configured by network entity 602 (e.g., using L1, L2, and/or L3 signaling) with one or more time-frequency resources in ON duration 706 to transmit WUS detection feedback. In certain aspects, when the gap size is less than (e.g., or equal to) the threshold, the UE 604 may transmit the WUS detection feedback in UL mobility occasion 702b, such as to avoid using additional resources, which may save power at UE 604.

In certain aspects, the gap size and/or threshold gap size is based on a numerology used for communicating the WUS, a fixed numerology, or an initial UL bandwidth part (BWP) numerology. In certain aspects, UE 604 is configured by network entity 602 (e.g., using L1, L2, and/or L3 signaling) with the threshold gap size.

Figure 8:
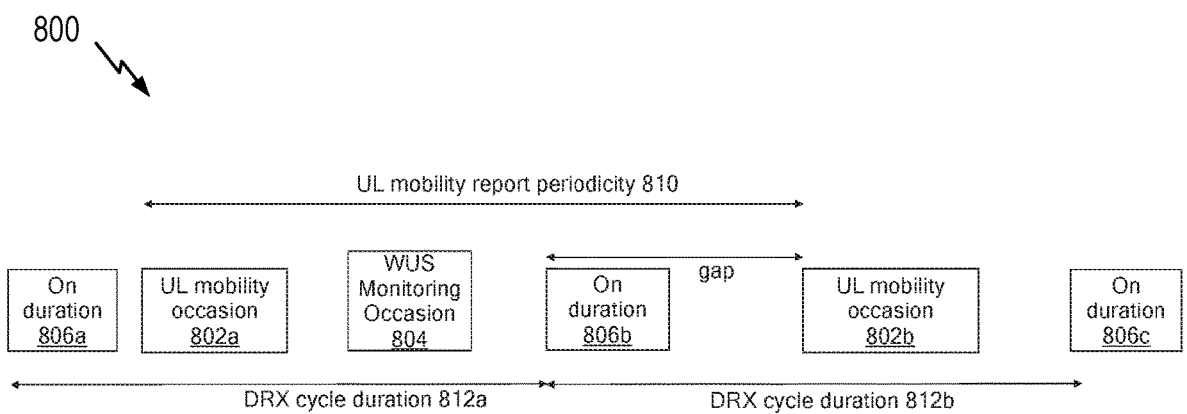
FIG. 8 illustrates another example timeline for WUS detection feedback based on a gap size between a start of a UL mobility occasion and a start of an ON duration occurring after a WUS monitoring occasion.

FIG. 8 illustrates another example timeline 800 for WUS detection feedback based on a gap size between a start of a UL mobility occasion and a start of an ON duration occurring after a WUS monitoring occasion. As shown, ON durations 806 occur periodically, with a periodicity of a DRX cycle duration 812. In particular, ON duration 806a occurs in time at a start in time of DRX cycle duration 812a, ON duration 806b occurs at a start of DRX cycle duration 812b (which occurs in time after DRX cycle duration 812a), and ON duration 806c occurs after DRX cycle duration 812b.

Further, UL mobility occasions 802 occur periodically with a UL mobility report periodicity 810. Though only two UL mobility occasions 802a and 802b are shown, more such UL mobility occasions 802 may occur, such as with the same UL mobility report periodicity 810.

WUS monitoring occasion 804 occurs in time between UL mobility occasion 802a and UL mobility occasion 802b. Accordingly, UL mobility occasion 802b is the first UL mobility occasion 802 in time on which UE 604 can transmit WUS detection feedback along with a UL mobility signal. In addition, an ON duration 806b occurs in time after WUS monitoring occasion 804. A gap size is shown between the start of ON duration 806b and the start of UL mobility occasion 802b.

In certain aspects, the gap size may be greater than the gap size threshold X. Accordingly, the UE 604 may transmit the WUS detection feedback during or before the ON duration 806b prior to the start of UL mobility occasion 802b, such as to avoid excess latency in transmitting the feedback. In certain aspects, UE 604 uses configured or dedicated resources (e.g., time-frequency resources) during or before the ON duration to transmit the feedback. In certain aspects, the network entity 602 configures such configured or dedicated resources (e.g., indicates a time-frequency location of such resources) at UE 604 by sending signaling, such as L1, L2, and/or L3 signaling. In certain aspects, network entity 602 configures such configured or dedicated resources using RRC signaling or a medium access control-control element (MAC-CE). In certain aspects, the network entity 602 activates use of a configured resource, meaning UE 604 cannot use such a configured resource unless activated by network entity 602. For example, network entity 602 may send signaling activating such a configured resource to UE 604. The activation signaling may include an index or identifier of such a configured resource. In certain aspects, the activation signaling is transmitted by L1, L2, and/or L3 signaling such as RRC or MAC-CE. In certain aspects, the UE 604 assumes that reception of a WUS at WUS monitoring occasion 804 is implicit signaling of activation of a configured resource (e.g., a next configured resource in time after occurrence in time of the WUS monitoring occasion 804). In certain aspects, the WUS includes explicit signaling of activation of a configured resource or of a dedicated resource.

Figure 9:
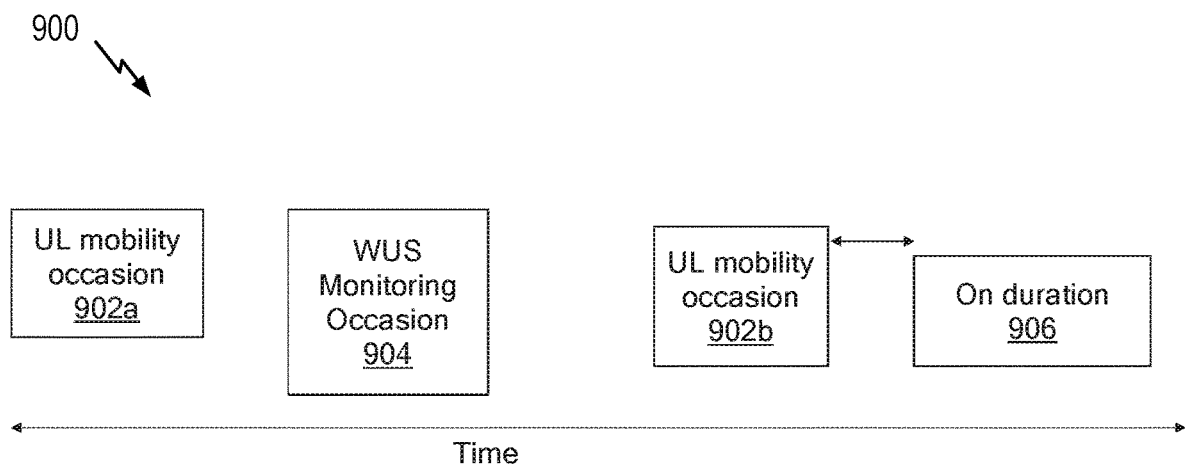
FIG. 9 illustrates an example timeline for WUS detection feedback based on a difference between occurrence of a UL mobility occasion and a start of an ON duration occurring after a WUS monitoring occasion.

In certain aspects, UE 604 determines whether to transmit WUS detection feedback in an UL mobility occasion based on whether a start time of an ON duration (e.g., occurring after the start time of the UL mobility occasion) is less than a threshold (e.g., threshold number of symbols) after a start time or an end time of the UL mobility occasion. FIG. 9 illustrates an example timeline 900 for WUS detection feedback based on a difference between occurrence of a UL mobility occasion and a start of an ON duration occurring after a WUS monitoring occasion.

As shown in timeline 900, UL mobility occasions 902 occur periodically, and are shown occurring as UL mobility occasions 902*a* and UL mobility occasions 902*b*. Though only two UL mobility occasions 902 are shown, more such UL mobility occasions 902 may occur, such as with the same periodicity.

Further, WUS monitoring occasion 904 occurs in time between UL mobility occasion 902*a* and UL mobility occasion 902*b*. Accordingly, the UL mobility occasion 902*b* is the first UL mobility occasion 902 in time on which UE 604 can transmit WUS detection feedback along with a UL mobility signal. In addition, an ON duration 906 occurs in time after the WUS monitoring occasion 904. Further, the ON duration 906 starts in time after the start in time of UL mobility occasion 902*b*. In certain aspects, the ON duration 906 may overlap in time with a part of the duration of UL mobility occasion 902*b*. In certain aspects, the ON duration 906 may start in time after an end in time of UL mobility occasion 902*b*.

In certain aspects, UE 604 determines whether to transmit WUS detection feedback, for WUS monitoring occasion 904, in UL mobility occasion 902*b* based on whether a start time of ON duration 906 is less than (e.g., or equal to) a threshold after an end time of the UL mobility occasion 902*b*. It is noted that where the ON duration 906 overlaps with the UL mobility occasion 902*b*, the start time of ON duration 906 is before the end time of the UL mobility occasion 902*b*, and therefore the threshold may be satisfied. In certain aspects, the difference in time and/or the threshold is based on a numerology used for communicating the WUS, a fixed numerology, or an initial UL bandwidth part (BWP) numerology. In certain aspects, UE 604 is configured by network entity 602 (e.g., using L1, L2, and/or L3 signaling) with the threshold.

In certain aspects, where the start time of ON duration 906 is greater than (e.g., or equal to) the threshold after the end time of the UL mobility occasion 902*b*, UE 604 transmits the WUS detection feedback in the UL mobility occasion 902*b* along with an UL mobility signal, such as to reduce latency.

In certain aspects, where the start time of ON duration 906 is less than (e.g., or equal to) the threshold after the end time of the UL mobility occasion 902*b*, UE 604 may transmit the WUS detection feedback during or before the ON duration 906 and after the end time of UL mobility occasion 902*b*. In certain aspects, UE 604 uses configured or dedicated resources (e.g., time-frequency resources) during or before the ON duration 906 to transmit the feedback. In certain aspects, the network entity 602 configures such configured or dedicated resources (e.g., indicates a time-frequency location of such resources) at UE 604 by sending signaling, such as L1, L2, and/or L3 signaling. In certain aspects, network entity 602 configures such configured or dedicated resources using RRC signaling or a medium access control-control element (MAC-CE). In certain aspects, the network entity 602 activates use of a configured resource, meaning UE 604 cannot use such a configured resource unless activated by network entity 602. For example, network entity 602 may send signaling activating such a configured resource to UE 604. The activation signaling may include an index or identifier of such a configured resource. In certain aspects, the activation signaling is transmitted by L1, L2, and/or L3 signaling such as RRC or MAC-CE. In certain aspects, the UE 604 assumes that reception of a WUS at WUS monitoring occasion 904 is implicit signaling of activation of a configured resource (e.g., a next configured resource in time after end in time of the UL mobility occasion 902*b*). In certain aspects, the WUS includes explicit signaling of activation of a configured resource or of a dedicated resource.

In certain aspects, where the start time of ON duration 906 is less than (e.g., or equal to) the threshold after the end time of the UL mobility occasion 902*b*, and the UE 604 transmits the WUS detection feedback during or before the ON duration 906 and after the end time of UL mobility occasion 902*b*, the UE 604 refrains from transmitting a UL mobility signal in UL mobility occasion 902*b*. For example, where the start of an ON duration is less than (e.g., or equal to) the threshold after the end time of a UL mobility occasion, UE 604 may be configured to skip transmission of UL mobility signals in any UL mobility occasion that occurs between a WUS monitoring occasion (e.g., in which WUS is detected) and the ON duration before or during which WUS detection feedback is transmitted. Accordingly, the UE 604 may stay in a low power state for UL mobility occasion 902*b*, thereby saving power. In certain aspects, network entity 602 may send signaling (e.g., L1, L2, and/or L3 signaling) to UE 604 indicating to UE 604 to cancel all UL mobility signaling between a WUS monitoring occasion 904 (e.g., in which WUS is detected) and a next ON duration 906 that occurs after the WUS monitoring occasion 904. In certain aspects, UE 604 does transmit UL mobility signal in UL mobility occasion 902*b*, even when the WUS detection feedback is transmitted during or before the ON duration 906 and after the end time of UL mobility occasion 902*b*.

Example Operations of a User Equipment

Figure 10:
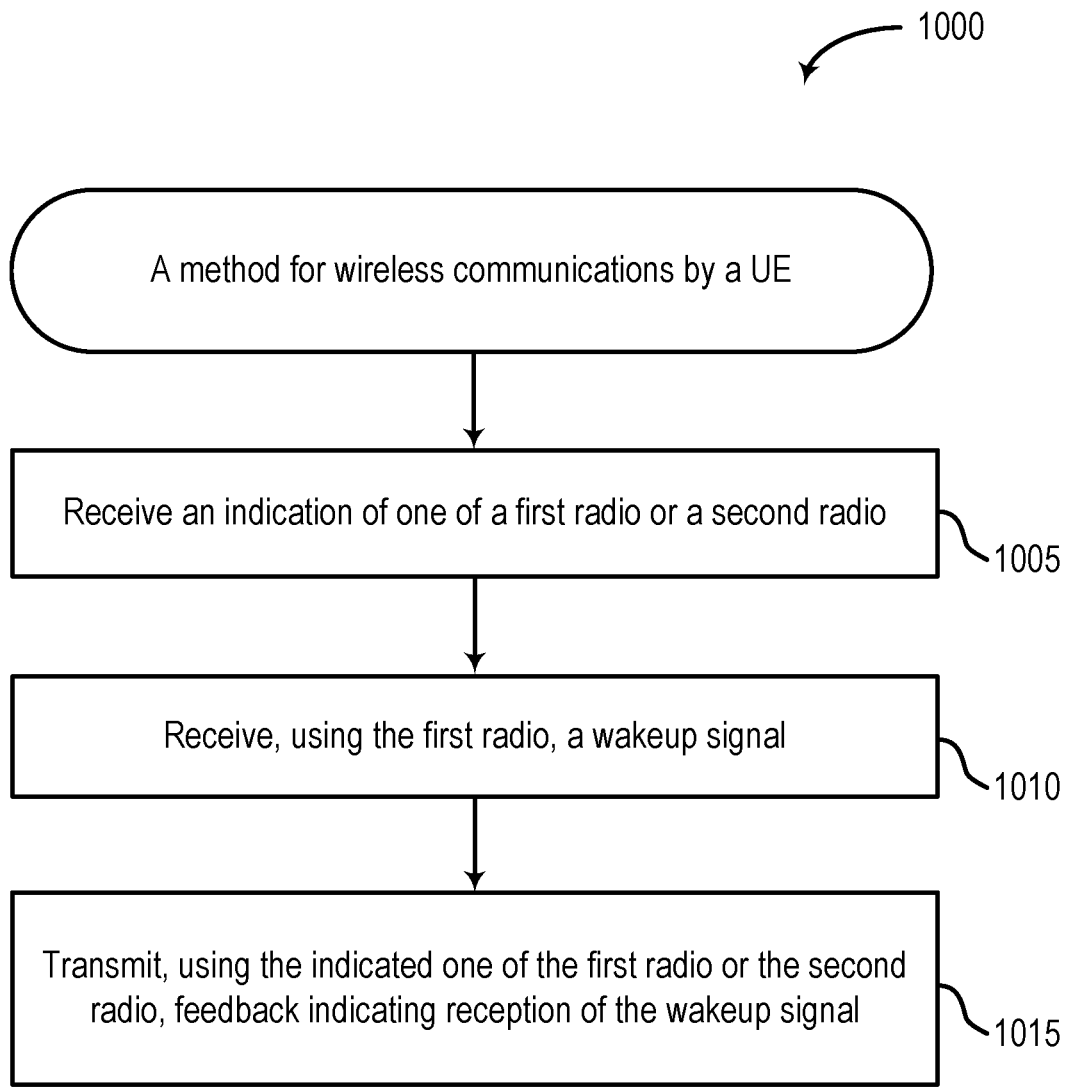
FIG. 10 depicts a method for wireless communications.

FIG. 10 shows an example of a method 1000 for wireless communications by a UE, such as UE 104 of FIGS. 1 and 3.

Method 1000 begins at step 1005 with receiving an indication of one of a first radio or a second radio. In some cases, the operations of this step refer to, or may be performed by, circuitry for receiving and/or code for receiving as described with reference to FIG. 12.

Method 1000 then proceeds to step 1010 with receiving, using the first radio, a wakeup signal. In some cases, the operations of this step refer to, or may be performed by, circuitry for receiving and/or code for receiving as described with reference to FIG. 12.

Method 1000 then proceeds to step 1015 with transmitting, using the indicated one of the first radio or the second radio, feedback indicating reception of the wakeup signal. In some cases, the operations of this step refer to, or may be performed by, circuitry for transmitting and/or code for transmitting as described with reference to FIG. 12.

In some aspects, the first radio comprises a WUR configured to at least monitor for wakeup signals, and the second radio comprises a MR configured to at least receive data signals.

In some aspects, the method 1000 further includes transmitting an indication of a capability to use the first radio for transmission. In some cases, the operations of this step refer to, or may be performed by, circuitry for transmitting and/or code for transmitting as described with reference to FIG. 12.

In some aspects, when the indicated one of the first radio or the second radio is the first radio, feedback is transmitted in one of sequence based UCI, polar encoder based UCI, or UCI multiplexed with uplink data.

In some aspects, the method 1000 further includes transmitting an indication of a preference between the first radio and the second radio for transmitting feedback. In some cases, the operations of this step refer to, or may be performed by, circuitry for transmitting and/or code for transmitting as described with reference to FIG. 12.

In some aspects, when the indicated one of the first radio or the second radio is the second radio, feedback is transmitted in one of: a random access channel message when the UE is transferring from an idle or inactive state to a connected state; a scheduling request when the UE is in the connected state; or an uplink reference signal when the UE is in the connected state.

In some aspects, transmitting the feedback comprises transmitting an uplink mobility signal with the feedback multiplexed with the uplink mobility signal.

In some aspects, the uplink mobility signal comprises one of a random access channel message, a physical uplink control channel, or a sounding reference signal.

In some aspects, the wakeup signal is received during a first time period, wherein an on duration starts after a first start time of the first time period, and wherein an uplink mobility occasion starts after a second start time of the on duration, and wherein transmitting the feedback comprises: when a time duration between a third start time of the uplink mobility occasion and the second start time is less than a threshold, transmitting an uplink mobility signal with the feedback multiplexed with the uplink mobility signal during the uplink mobility occasion; and when the time duration between the third start time and the second start time is greater than the threshold, transmitting the feedback during or before the on duration.

In some aspects, when the time duration between the third start time and the second start time is greater than the threshold, the feedback is transmitted in one or more resources indicated in the wakeup signal.

In some aspects, the wakeup signal is received during a first time period, wherein an uplink mobility occasion starts after a first start time of the first time period, and wherein an on duration starts after a second start time of the uplink mobility occasion, and wherein transmitting the feedback comprises: when a third start time of the on duration occurs before a threshold time after an end time of the uplink mobility occasion, transmitting the feedback in one or more resources indicated in the wakeup signal; and when the third start time of the on duration occurs after the threshold time after the end time of the uplink mobility occasion, transmitting an uplink mobility signal with the feedback multiplexed with the uplink mobility signal during the uplink mobility occasion.

In some aspects, the method 1000 further includes, when the third start time of the on duration occurs before the threshold time after the end time of the uplink mobility occasion, refraining from transmitting during the uplink mobility occasion. In some cases, the operations of this step refer to, or may be performed by, circuitry for refraining and/or code for refraining as described with reference to FIG. 12.

In some aspects, the method 1000 further includes receiving signaling indicating cancellation of uplink mobility measurement and reporting between reception of the wakeup signal and a next on duration in time after reception of the wakeup signal. In some cases, the operations of this step refer to, or may be performed by, circuitry for receiving and/or code for receiving as described with reference to FIG. 12.

In some aspects, the wakeup signal is received using a receive beam of the UE, and wherein the feedback is transmitted using a transmit beam of the UE that is quasi-co-located with the receive beam of the UE.

Figure 12:
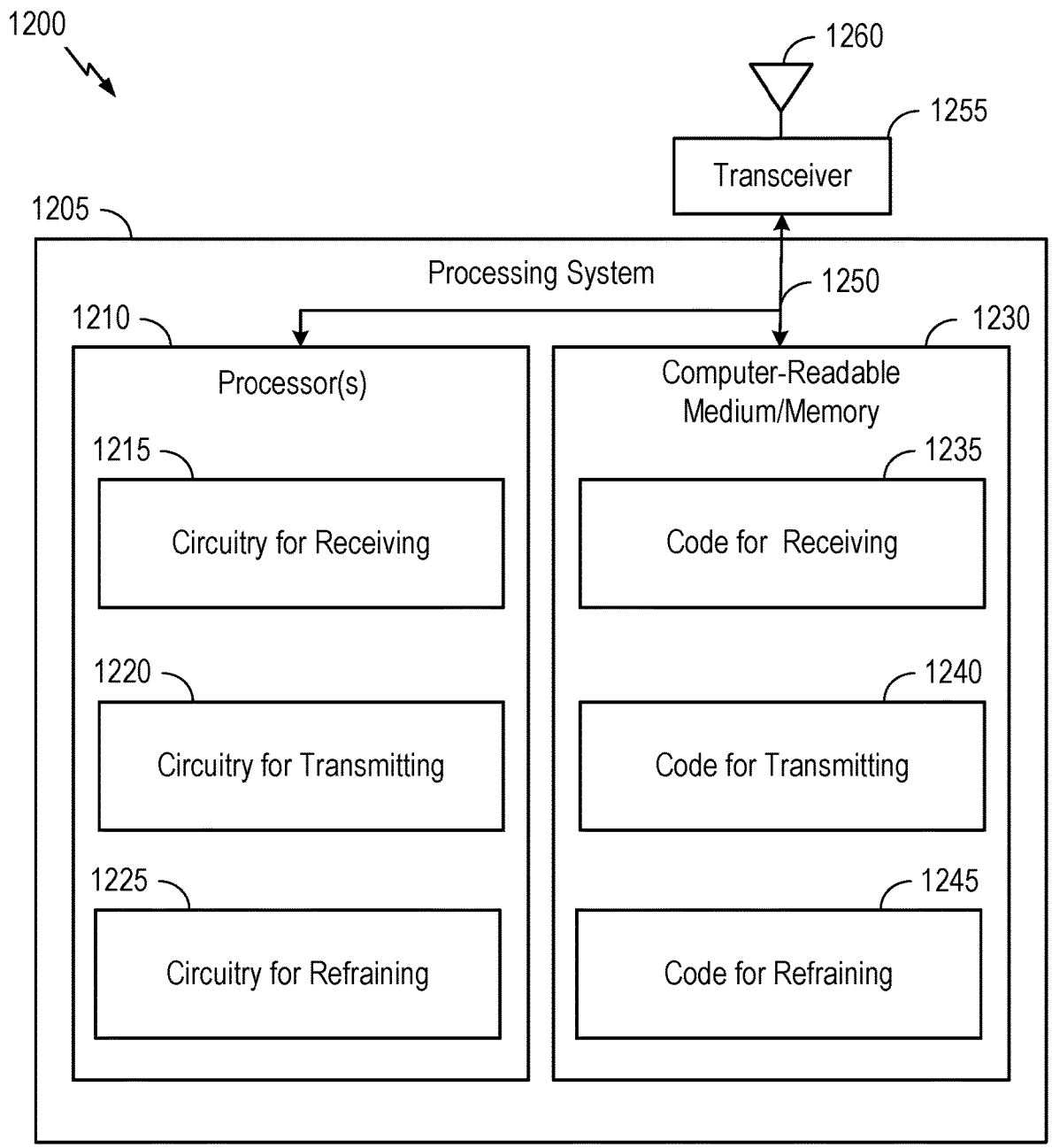
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Operations of a Network Entity

Figure 11:
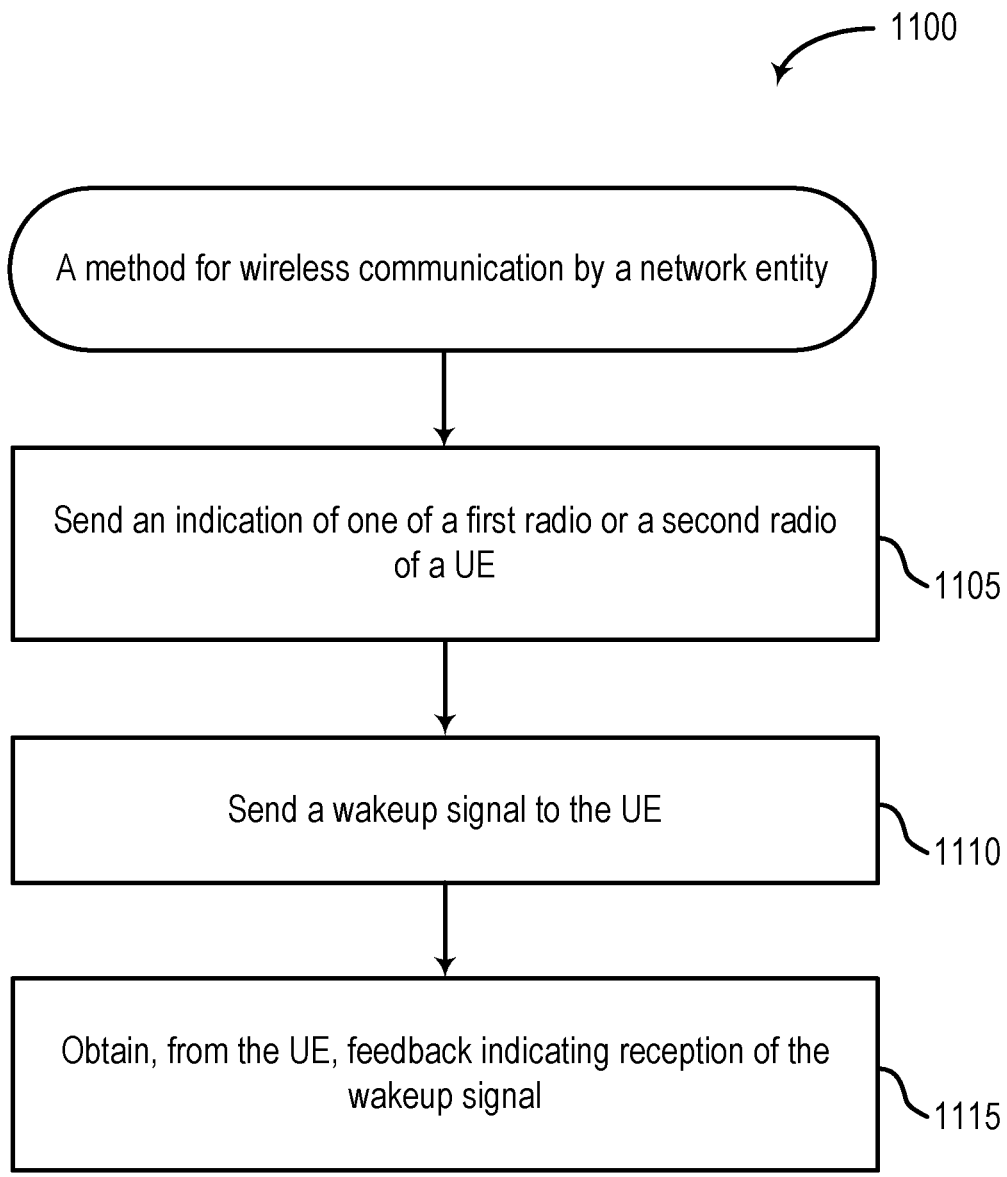
FIG. 11 depicts a method for wireless communications.

FIG. 11 shows an example of a method 1100 for wireless communications by a network entity, such as BS 102 of FIGS. 1 and 3, or a disaggregated base station as discussed with respect to FIG. 2.

Method 1100 begins at step 1105 with sending an indication of one of a first radio or a second radio of a UE. In some cases, the operations of this step refer to, or may be performed by, circuitry for sending and/or code for sending as described with reference to FIG. 13.

Method 1100 then proceeds to step 1110 with sending a wakeup signal to the UE. In some cases, the operations of this step refer to, or may be performed by, circuitry for sending and/or code for sending as described with reference to FIG. 13.

Method 1100 then proceeds to step 1115 with obtaining, from the UE, feedback indicating reception of the wakeup signal. In some cases, the operations of this step refer to, or may be performed by, circuitry for obtaining and/or code for obtaining as described with reference to FIG. 13.

In some aspects, the method 1100 further includes obtaining an indication of a capability of the UE to use the first radio for transmission. In some cases, the operations of this step refer to, or may be performed by, circuitry for obtaining and/or code for obtaining as described with reference to FIG. 13.

In some aspects, the indication of the capability further indicates a capability of the UE to transmit feedback in one of sequence based UCI, polar encoder based UCI, or UCI multiplexed with uplink data.

In some aspects, the method 1100 further includes obtaining an indication of a preference of the UE between the first radio and the second radio for transmitting feedback. In some cases, the operations of this step refer to, or may be performed by, circuitry for obtaining and/or code for obtaining as described with reference to FIG. 13.

In some aspects, when the indicated one of the first radio or the second radio is the second radio, feedback is obtained in one of: a random access channel message; a scheduling request; or an uplink reference signal.

In some aspects, obtaining the feedback comprises obtaining an uplink mobility signal with the feedback multiplexed with the uplink mobility signal.

In some aspects, the uplink mobility signal comprises one of a random access channel message, a physical uplink control channel, or a sounding reference signal.

In some aspects, the wakeup signal is sent during a first time period, wherein an on duration starts after a first start time of the first time period, and wherein an uplink mobility occasion starts after a second start time of the on duration, and wherein obtaining the feedback comprises: when a time duration between a third start time of the uplink mobility occasion and the second start time is less than a threshold, obtaining an uplink mobility signal with the feedback multiplexed with the uplink mobility signal during the uplink mobility occasion; and when the time duration between the third start time and the second start time is greater than the threshold, obtaining the feedback during or before the on duration.

In some aspects, when the time duration between the third start time and the second start time is greater than the threshold, the feedback is obtained in one or more resources indicated in the wakeup signal.

In some aspects, the wakeup signal is sent during a first time period, wherein an uplink mobility occasion starts after a first start time of the first time period, and wherein an on duration starts after a second start time of the uplink mobility occasion, and wherein obtaining the feedback comprises: when a third start time of the on duration occurs before a threshold time after an end time of the uplink mobility occasion, obtaining the feedback in one or more resources indicated in the wakeup signal; and when the third start time of the on duration occurs after the threshold time after the end time of the uplink mobility occasion, obtaining an uplink mobility signal with the feedback multiplexed with the uplink mobility signal during the uplink mobility occasion.

In some aspects, the method 1100 further includes sending signaling indicating cancellation of uplink mobility measurement and reporting between sending of the wakeup signal and a next on duration in time after sending of the wakeup signal. In some cases, the operations of this step refer to, or may be performed by, circuitry for sending and/or code for sending as described with reference to FIG. 13.

Figure 13:
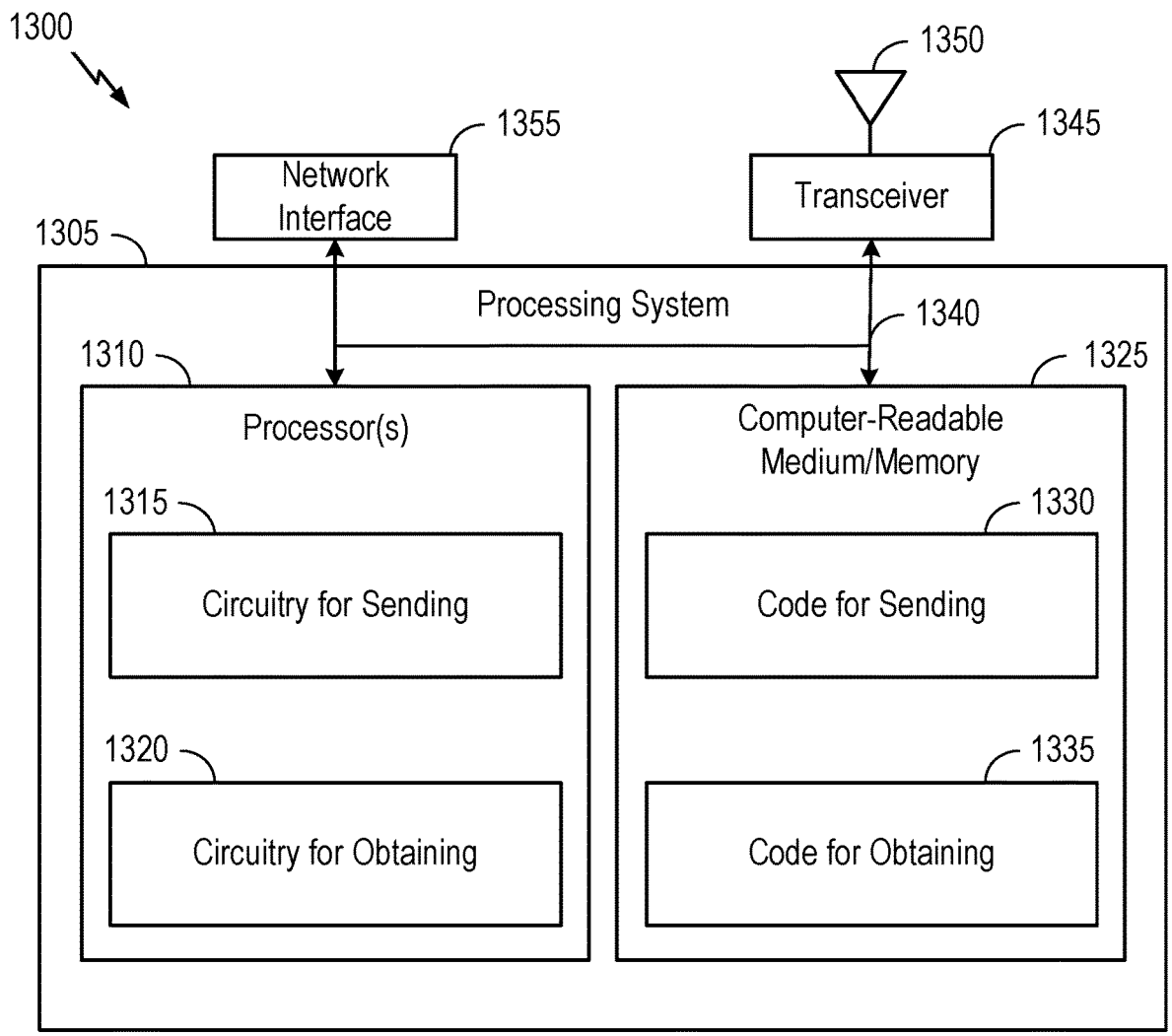
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to the transceiver 1255 (e.g., a transmitter and/or a receiver). The transceiver 1255 is configured to transmit and receive signals for the communications device 1200 via the antenna 1260, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1230 via a bus 1250. In certain aspects, the computer-readable medium/memory 1230 is configured to store instructions (e.g., computer-executable code) that when executed by the one or more processors 1210, cause the one or more processors 1210 to perform the method 1000 described with respect to FIG. 10, or any aspect related to it. Note that reference to a processor performing a function of communications device 1200 may include one or more processors 1210 performing that function of communications device 1200.

In the depicted example, computer-readable medium/memory 1230 stores code (e.g., executable instructions), such as code for receiving 1235, code for transmitting 1240, and code for refraining 1245. Processing of the code for receiving 1235, code for transmitting 1240, and code for refraining 1245 may cause the communications device 1200 to perform the method 1000 described with respect to FIG. 10, or any aspect related to it.

The one or more processors 1210 include circuitry configured to implement (e.g., execute) the code stored in the computer-readable medium/memory 1230, including circuitry such as circuitry for receiving 1215, circuitry for transmitting 1220, and circuitry for refraining 1225. Processing with circuitry for receiving 1215, circuitry for transmitting 1220, and circuitry for refraining 1225 may cause the communications device 1200 to perform the method 1000 described with respect to FIG. 10, or any aspect related to it.

Various components of the communications device 1200 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1255 and the antenna 1260 of the communications device 1200 in FIG. 12. Means for receiving or obtaining may include transceivers 354 and/or antenna(s) 352 of the UE 104 illustrated in FIG. 3 and/or the transceiver 1255 and the antenna 1260 of the communications device 1200 in FIG. 12.

FIG. 13 depicts aspects of an example communications device 1300. In some aspects, communications device 1300 is a network entity, such as BS 102 of FIGS. 1 and 3, or a disaggregated base station as discussed with respect to FIG. 2.

The communications device 1300 includes a processing system 1305 coupled to the transceiver 1345 (e.g., a transmitter and/or a receiver) and/or a network interface 1355. The transceiver 1345 is configured to transmit and receive signals for the communications device 1300 via the antenna 1350, such as the various signals as described herein. The network interface 1355 is configured to obtain and send signals for the communications device 1300 via communication link(s), such as a backhaul link, midhaul link, and/or fronthaul link as described herein, such as with respect to FIG. 2. The processing system 1305 may be configured to perform processing functions for the communications device 1300, including processing signals received and/or to be transmitted by the communications device 1300.

The processing system 1305 includes one or more processors 1310. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1325 via a bus 1340. In certain aspects, the computer-readable medium/memory 1325 is configured to store instructions (e.g., computer-executable code) that when executed by the one or more processors 1310, cause the one or more processors 1310 to perform the method 1100 described with respect to FIG. 11, or any aspect related to it. Note that reference to a processor of communications device 1300 performing a function may include one or more processors 1310 of communications device 1300 performing that function.

In the depicted example, the computer-readable medium/memory 1325 stores code (e.g., executable instructions), such as code for sending 1330 and code for obtaining 1335. Processing of the code for sending 1330 and code for obtaining 1335 may cause the communications device 1300 to perform the method 1100 described with respect to FIG. 11, or any aspect related to it.

The one or more processors 1310 include circuitry configured to implement (e.g., execute) the code stored in the computer-readable medium/memory 1325, including circuitry such as circuitry for sending 1315 and circuitry for obtaining 1320. Processing with circuitry for sending 1315 and circuitry for obtaining 1320 may cause the communications device 1300 to perform the method 1100 as described with FIG. 11, or any aspect related to it.

Various components of the communications device 1300 may provide means for performing the method 1100 as described with respect to FIG. 11, or any aspect related to it. Means for transmitting, sending or outputting for transmission may include transceivers 332 and/or antenna(s) 334 of the BS 102 illustrated in FIG. 3 and/or the transceiver 1345 and the antenna 1350 of the communications device 1300 in FIG. 13. Means for receiving or obtaining may include transceivers 332 and/or antenna(s) 334 of the BS 102 illustrated in FIG. 3 and/or the transceiver 1345 and the antenna 1350 of the communications device 1300 in FIG. 13.

Example Clauses

Implementation examples are described in the following numbered clauses:

Clause 1: A method for wireless communications by a UE comprising: receiving an indication of one of a first radio or a second radio; receiving, using the first radio, a wakeup signal; and transmitting, using the indicated one of the first radio or the second radio, feedback indicating reception of the wakeup signal.

Clause 2: The method of Clause 1, wherein: the first radio comprises a WUR configured to at least monitor for wakeup signals, and the second radio comprises a MR configured to at least receive data signals.

Clause 3: The method of any one of Clauses 1 and 2, further comprising: transmitting an indication of a capability to use the first radio for transmission.

Clause 4: The method of any one of Clauses 1-3, wherein when the indicated one of the first radio or the second radio is the first radio, feedback is transmitted in one of sequence based UCI, polar encoder based UCI, or UCI multiplexed with uplink data.

Clause 5: The method of any one of Clauses 1-4, further comprising: transmitting an indication of a preference between the first radio and the second radio for transmitting feedback.

Clause 6: The method of any one of Clauses 1-5, wherein when the indicated one of the first radio or the second radio is the second radio, feedback is transmitted in one of: a random access channel message when the UE is transferring from an idle or inactive state to a connected state; a scheduling request when the UE is in the connected state; or an uplink reference signal when the UE is in the connected state.

Clause 7: The method of any one of Clauses 1-6, wherein transmitting the feedback comprises transmitting an uplink mobility signal with the feedback multiplexed with the uplink mobility signal.

Clause 8: The method of Clause 7, wherein the uplink mobility signal comprises one of a random access channel message, a physical uplink control channel, or a sounding reference signal.

Clause 9: The method of any one of Clauses 1-8, wherein the wakeup signal is received during a first time period, wherein an on duration starts after a first start time of the first time period, and wherein an uplink mobility occasion starts after a second start time of the on duration, and wherein transmitting the feedback comprises: when a time duration between a third start time of the uplink mobility occasion and the second start time is less than a threshold, transmitting an uplink mobility signal with the feedback multiplexed with the uplink mobility signal during the uplink mobility occasion; and when the time duration between the third start time and the second start time is greater than the threshold, transmitting the feedback during or before the on duration.

Clause 10: The method of Clause 9, wherein when the time duration between the third start time and the second start time is greater than the threshold, the feedback is transmitted in one or more resources indicated in the wakeup signal.

Clause 11: The method of any one of Clauses 1-10, wherein the wakeup signal is received during a first time period, wherein an uplink mobility occasion starts after a first start time of the first time period, and wherein an on duration starts after a second start time of the uplink mobility occasion, and wherein transmitting the feedback comprises: when a third start time of the on duration occurs before a threshold time after an end time of the uplink mobility occasion, transmitting the feedback in one or more resources indicated in the wakeup signal; and when the third start time of the on duration occurs after the threshold time after the end time of the uplink mobility occasion, transmitting an uplink mobility signal with the feedback multiplexed with the uplink mobility signal during the uplink mobility occasion.

Clause 12: The method of Clause 11, further comprising, when the third start time of the on duration occurs before the threshold time after the end time of the uplink mobility occasion, refraining from transmitting during the uplink mobility occasion.

Clause 13: The method of any one of Clauses 1-12, further comprising: receiving signaling indicating cancellation of uplink mobility measurement and reporting between reception of the wakeup signal and a next on duration in time after reception of the wakeup signal.

Clause 14: The method of any one of Clauses 1-13, wherein the wakeup signal is received using a receive beam of the UE, and wherein the feedback is transmitted using a transmit beam of the UE that is quasi-co-located with the receive beam of the UE.

Clause 15: A method for wireless communication by a network entity comprising: sending an indication of one of a first radio or a second radio of a UE; sending a wakeup signal to the UE; and obtaining, from the UE, feedback indicating reception of the wakeup signal.

Clause 16: The method of Clause 15, further comprising: obtaining an indication of a capability of the UE to use the first radio for transmission.

Clause 17: The method of Clause 16, wherein the indication of the capability further indicates a capability of the UE to transmit feedback in one of sequence based UCI, polar encoder based UCI, or UCI multiplexed with uplink data.

Clause 18: The method of any one of Clauses 15-17, further comprising: obtaining an indication of a preference of the UE between the first radio and the second radio for transmitting feedback.

Clause 19: The method of any one of Clauses 15-18, wherein when the indicated one of the first radio or the second radio is the second radio, feedback is obtained in one of: a random access channel message; a scheduling request; or an uplink reference signal.

Clause 20: The method of any one of Clauses 15-19, wherein obtaining the feedback comprises obtaining an uplink mobility signal with the feedback multiplexed with the uplink mobility signal.

Clause 21: The method of Clause 20, wherein the uplink mobility signal comprises one of a random access channel message, a physical uplink control channel, or a sounding reference signal.

Clause 22: The method of any one of Clauses 15-21, wherein the wakeup signal is sent during a first time period, wherein an on duration starts after a first start time of the first time period, and wherein an uplink mobility occasion starts after a second start time of the on duration, and wherein obtaining the feedback comprises: when a time duration between a third start time of the uplink mobility occasion and the second start time is less than a threshold, obtaining an uplink mobility signal with the feedback multiplexed with the uplink mobility signal during the uplink mobility occasion; and when the time duration between the third start time and the second start time is greater than the threshold, obtaining the feedback during or before the on duration.

Clause 23: The method of Clause 22, wherein when the time duration between the third start time and the second start time is greater than the threshold, the feedback is obtained in one or more resources indicated in the wakeup signal.

Clause 24: The method of any one of Clauses 15-23, wherein the wakeup signal is sent during a first time period, wherein an uplink mobility occasion starts after a first start time of the first time period, and wherein an on duration starts after a second start time of the uplink mobility occasion, and wherein obtaining the feedback comprises: when a third start time of the on duration occurs before a threshold time after an end time of the uplink mobility occasion, obtaining the feedback in one or more resources indicated in the wakeup signal; and when the third start time of the on duration occurs after the threshold time after the end time of the uplink mobility occasion, obtaining an uplink mobility signal with the feedback multiplexed with the uplink mobility signal during the uplink mobility occasion.

Clause 25: The method of any one of Clauses 15-24, further comprising: sending signaling indicating cancellation of uplink mobility measurement and reporting between sending of the wakeup signal and a next on duration in time after sending of the wakeup signal.

Clause 26: An apparatus, comprising: a memory comprising executable instructions; and a processor configured to execute the executable instructions and cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising executable instructions that, when executed by a processor of an apparatus, cause the apparatus to perform a method in accordance with any one of Clauses 1-25.

Clause 29: A computer program product embodied on a computer-readable storage medium comprising code for performing a method in accordance with any one of Clauses 1-25.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) comprising:
a first radio;
a second radio;
memory comprising computer-executable instructions; and
one or more processors configured to execute the computer-executable instructions and cause the UE to:
transmit a first indication of a preference of the UE to use one of the first radio or the second radio to transmit feedback indicating reception of a wakeup signal;
receive, in response to the first indication of the preference of the UE, a second indication of one of the first radio or the second radio to use to transmit the feedback;
receive, using the first radio, the wakeup signal; and
transmit, using the one of the first radio or the second radio indicated in the second indication, the feedback indicating reception of the wakeup signal.

2. The UE of claim 1, wherein:
the first radio comprises a wakeup radio (WUR) configured to at least monitor for wakeup signals; and
the second radio comprises a main radio (MR) configured to at least receive data signals.

3. The UE of claim 1, wherein the one or more processors are further configured to cause the UE to transmit an indication of a capability of the UE to use the first radio for transmission.

4. The UE of claim 1, wherein when the indicated one of the first radio or the second radio, in the second indication, is the first radio, the one or more processors are configured to, individually or collectively, cause the UE to transmit the feedback in one of sequence based uplink control information (UCI), polar encoder based UCI, or UCI multiplexed with uplink data.

5. The UE of claim 1, wherein when the indicated one of the first radio or the second radio, in the second indication, is the second radio, the one or more processors are configured to, individually or collectively, cause the UE to transmit the feedback in one of:
a scheduling request when the UE is in a connected state; or
a sounding reference signal when the UE is in the connected state.

6. The UE of claim 1, wherein the one or more processors are configured to, individually or collectively, cause the UE to transmit the feedback multiplexed with an uplink mobility signal.

7. The UE of claim 6, wherein the uplink mobility signal comprises one of a random access channel message, a physical uplink control channel, or a sounding reference signal.

8. The UE of claim 1, wherein the one or more processors are configured to, individually or collectively, cause the UE to receive signaling indicating cancellation of uplink mobility measurement and reporting between reception of the wakeup signal and a next on duration in time after reception of the wakeup signal.

9. The UE of claim 1, wherein the one or more processors are configured to, individually or collectively, cause the UE to:
receive the wakeup signal using a receive beam of the UE; and
transmit the feedback using a transmit beam of the UE that is quasi-co-located with the receive beam of the UE.

10. A user equipment (UE), comprising:
a first radio;
a second radio;
memory comprising computer-executable instructions; and
one or more processors configured to, individually or collectively, execute the computer-executable instructions and cause the UE to:
receive an indication of one of the first radio or the second radio;
receive, using the first radio, a wakeup signal during a first time period, wherein an on duration starts after a first start time of the first time period, and wherein an uplink mobility occasion starts after a second start time of the on duration;
when a time duration between a third start time of the uplink mobility occasion and the second start time is less than a threshold, transmit an uplink mobility signal with feedback multiplexed with the uplink mobility signal during the uplink mobility occasion, the feedback indicating reception of the wakeup signal; and
when the time duration between the third start time and the second start time is greater than the threshold, transmit the feedback during or before the on duration.

11. The UE of claim 10, wherein the one or more processors are configured to, individually or collectively, cause the UE to, when the time duration between the third start time and the second start time is greater than the threshold, transmit the feedback in one or more resources indicated in the wakeup signal.

12. A user equipment (UE), comprising:
a first radio;
a second radio;
memory comprising computer-executable instructions; and
one or more processors configured to, individually or collectively, execute the computer-executable instructions and cause the UE to:
receive an indication of one of the first radio or the second radio;
receive, using the first radio, a wakeup signal during a first time period, wherein an uplink mobility occasion starts after a first start time of the first time period, and wherein an on duration starts after a second start time of the uplink mobility occasion;
when a third start time of the on duration occurs before a threshold time after an end time of the uplink mobility occasion, transmit feedback in one or more resources indicated in the wakeup signal, the feedback indicating reception of the wakeup signal; and
when the third start time of the on duration occurs after the threshold time after the end time of the uplink mobility occasion, transmit an uplink mobility signal with the feedback multiplexed with the uplink mobility signal during the uplink mobility occasion.

13. The UE of claim 12, wherein the one or more processors are configured to, individually or collectively, cause the UE to, when the third start time of the on duration occurs before the threshold time after the end time of the uplink mobility occasion, refrain from transmitting during the uplink mobility occasion.

14. A network entity comprising:
memory comprising computer-executable instructions; and
one or more processors configured to, individually or collectively, execute the computer-executable instructions and cause the network entity to:
obtain, from a user equipment (UE), a first indication of a preference of the UE to use one of a first radio or a second radio to transmit feedback indicating reception of a wakeup signal;
send, in response to the first indication of the preference of the UE, a second indication of one of the first radio or the second radio of UE to use to transmit the feedback;
send a wakeup signal to the UE; and
obtain, from the UE, the feedback indicating reception of the wakeup signal.

15. The network entity of claim 14, wherein the one or more processors are further configured to, individually or collectively, cause the network entity to obtain an indication of a capability of the UE to use the first radio for transmission.

16. The network entity of claim 15, wherein the indication of the capability further indicates a capability of the UE to transmit the feedback in one of sequence based uplink control information (UCI), polar encoder based UCI, or UCI multiplexed with uplink data.

17. The network entity of claim 14, wherein when the indicated one of the first radio or the second radio is the second radio, feedback is obtained in one of:
a scheduling request; or
a sounding reference signal.

18. The network entity of claim 14, wherein the one or more processors are configured to, individually or collectively, cause the network entity to obtain the feedback multiplexed in an uplink mobility signal.

19. The network entity of claim 18, wherein the uplink mobility signal comprises one of a random access channel message, a physical uplink control channel, or a sounding reference signal.

20. The network entity of claim 14, wherein the one or more processors are configured to, individually or collectively, cause the network entity to send signaling indicating cancellation of uplink mobility measurement and reporting between sending of the wakeup signal and a next on duration in time after sending of the wakeup signal.

21. A network entity, comprising:
memory comprising computer-executable instructions; and
one or more processors configured to, individually or collectively, execute the computer-executable instructions and cause the network entity to:
send an indication of one of a first radio or a second radio of a user equipment (UE);
send a wakeup signal to the UE during a first time period, wherein an on duration starts after a first start time of the first time period, and wherein an uplink mobility occasion starts after a second start time of the on duration;
when a time duration between a third start time of the uplink mobility occasion and the second start time is less than a threshold, obtain an uplink mobility signal with feedback multiplexed with the uplink mobility signal during the uplink mobility occasion, the feedback indicating reception of the wakeup signal; and
when the time duration between the third start time and the second start time is greater than the threshold, obtain the feedback during or before the on duration.

22. The network entity of claim 21, wherein the one or more processors are configured to, individually or collectively, cause the network entity to, when the time duration between the third start time and the second start time is greater than the threshold, obtain the feedback in one or more resources indicated in the wakeup signal.

23. A network entity, comprising:
memory comprising computer-executable instructions; and
one or more processors configured to, individually or collectively, execute the computer-executable instructions and cause the network entity to:
send an indication of one of a first radio or a second radio of a user equipment (UE);
send a wakeup signal to the UE during a first time period, wherein an uplink mobility occasion starts after a first start time of the first time period, and wherein an on duration starts after a second start time of the uplink mobility occasion;
when a third start time of the on duration occurs before a threshold time after an end time of the uplink mobility occasion, obtain feedback in one or more resources indicated in the wakeup signal, the feedback indicating reception of the wakeup signal; and
when the third start time of the on duration occurs after the threshold time after the end time of the uplink mobility occasion, obtain an uplink mobility signal with the feedback multiplexed with the uplink mobility signal during the uplink mobility occasion.

24. A method for wireless communication by a user equipment (UE), the method comprising:
transmitting a first indication of a preference of the UE to use one of a first radio or a second radio to transmit feedback indicating reception of a wakeup signal;

receiving, in response to the indication of the preference of the UE, a second indication of one of the first radio or the second radio to use to transmit the feedback;
receiving, using the first radio, the wakeup signal; and
transmitting, using the one of the first radio or the second radio indicated in the second indication, the feedback indicating reception of the wakeup signal.

25. The method of claim 24, further comprising transmitting an indication of a capability to use the first radio for transmission.

26. The method of claim 24, wherein when the indicated one of the first radio or the second radio is the first radio, the feedback is received in one of sequence based uplink control information (UCI), polar encoder based UCI, or UCI multiplexed with uplink data.

27. A method for wireless communication by a network entity, the method comprising:
   obtaining, from a user equipment (UE), a first indication of a preference of the UE to use one of a first radio or a second radio to transmit feedback indicating reception of a wakeup signal;
   sending, in response to the first indication of the preference of the UE, a second indication of one of a first radio or a second radio of UE to use to transmit the feedback;
   sending a wakeup signal to the UE; and
   obtaining, from the UE, the feedback indicating reception of the wakeup signal.

28. The method of claim 27, further comprising obtaining an indication of a capability of the UE to use the first radio for transmission.

* * * * *